United States Patent
Schlangen et al.

(10) Patent No.: US 9,150,182 B1
(45) Date of Patent: Oct. 6, 2015

(54) VEHICLE

(71) Applicant: Polaris Industries Inc., Medina, MN (US)

(72) Inventors: Adam J. Schlangen, Rush City, MN (US); Bradley R. Morisch, Lindstrom, MN (US); Travis J. Ellefson, Luck, WI (US); Richard R. Maki, North Branch, MN (US); Carlos A. Villafan Rojas, Blaine, MN (US); Jason K. Raska, New Richmond, WI (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/292,310

(22) Filed: May 30, 2014

(51) Int. Cl.
- *B60R 21/13* (2006.01)
- *B60N 2/01* (2006.01)
- *B62D 33/02* (2006.01)
- *B60N 2/38* (2006.01)

(52) U.S. Cl.
CPC .............. *B60R 21/13* (2013.01); *B60N 2/012* (2013.01); *B60N 2/38* (2013.01); *B62D 33/02* (2013.01); *B60R 2021/134* (2013.01)

(58) Field of Classification Search
CPC .. B60R 21/13; B60R 2021/134; B60N 2/012; B60N 2/38; B60N 2/01; B60N 2/36; B60J 7/0053; B60J 7/08; B60J 7/10; B60J 7/102; B62D 33/02

See application file for complete search history.

(56) References Cited

U.S. PATENT DOCUMENTS

| | | | |
|---|---|---|---|
| 3,833,253 A * | 9/1974 | Butler | 296/165 |
| 5,429,290 A * | 7/1995 | Greene, Jr. | 224/274 |
| 2006/0273566 A1 | 12/2006 | Hepner et al. | |
| 2011/0298189 A1 * | 12/2011 | Schneider et al. | 280/80.1 |
| 2013/0256050 A1 * | 10/2013 | Novotny et al. | 180/271 |
| 2014/0124279 A1 * | 5/2014 | Schlangen et al. | 180/68.4 |
| 2014/0210234 A1 * | 7/2014 | Ricketts et al. | 296/193.03 |
| 2014/0262583 A1 * | 9/2014 | Url | 180/233 |
| 2014/0353956 A1 * | 12/2014 | Bjerketvedt et al. | 280/756 |

FOREIGN PATENT DOCUMENTS

DE 3516671 A1 11/1986
WO WO 98/12095 A2 3/1998

OTHER PUBLICATIONS

International Search Report and Written Opinion issued by the European Patent Office, dated Jul. 30, 2015, for related International Application No. PCT/US2015/033327; 9 pages.

* cited by examiner

*Primary Examiner* — Drew Brown
(74) *Attorney, Agent, or Firm* — Faegre Baker Daniels LLP

(57) ABSTRACT

In one embodiment, a utility vehicle includes a plurality of ground-engaging members configured to contact a ground surface, and a powertrain assembly operably coupled to the ground-engaging members. The utility vehicle also includes a frame supported by the ground-engaging members and extending along a longitudinal axis of the utility vehicle. The utility vehicle further includes a rear seating area defined by longitudinally extending side by side seats arranged on both sides of the vehicle. A rear cab frame is positioned over the rear seating area and has an upright and folded position.

28 Claims, 18 Drawing Sheets

VEHICLE

CROSS-REFERENCE TO RELATED APPLICATIONS

The present application is related to U.S. Provisional Patent Application Ser. No. 61/703,383, filed Sep. 20, 2012, entitled "VEHICLE"; U.S. Provisional Patent Application Ser. No. 61/822,113, filed May 10, 2013, entitled "VEHICLE"; U.S. Utility patent application Ser. No. 14/031,950, filed Sep. 19, 2013, entitled "VEHICLE"; and PCT Patent Application PCT/US2013/061002; the complete disclosures of which are expressly incorporated herein by reference.

BACKGROUND

The present invention relates generally to a vehicle and in particular to a vehicle with ergonomic, safety, maintenance, and other features.

SUMMARY

Vehicles such as utility vehicles, all-terrain vehicles, tractors, and other similar vehicles are known. Such vehicles may include forward and rear storage compartments, such as trunks. The vehicles also may be configured to couple with sub-assemblies having axles, such as trailers.

Utility vehicles are also configured to support at least an operator. Some utility vehicles may support one or more passengers. The passengers may share a bench seat, or the vehicle may be individual seats in a side-by-side configuration.

In one embodiment, a utility vehicle comprises a plurality of ground-engaging members configured to contact a ground surface; a drivetrain assembly operably coupled to the ground-engaging members; a frame supported by the ground-engaging members and extending along a longitudinal axis of the utility vehicle; a rear support area supported by the frame, the rear support area having a rear platform having at least a first seating position; and a rear cab frame having an upright position and a folded position.

In another embodiment, a utility vehicle comprises a plurality of ground-engaging members; a frame assembly supported by the ground-engaging members and extending along a longitudinal axis of the utility vehicle; seating sections supported by the frame assembly and including a first plurality of seats in a laterally side-by-side configuration, a second plurality of seats in a laterally side-by-side configuration, positioned rearward of the first plurality, and a third plurality of seats in a longitudinally side-by-side configuration, positioned rearward of the second plurality; and a first cab frame positioned over the first and second seating positions, and a rear cab frame positioned over the third plurality of seats.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, snowmobiles, and golf carts.

Figure 1:
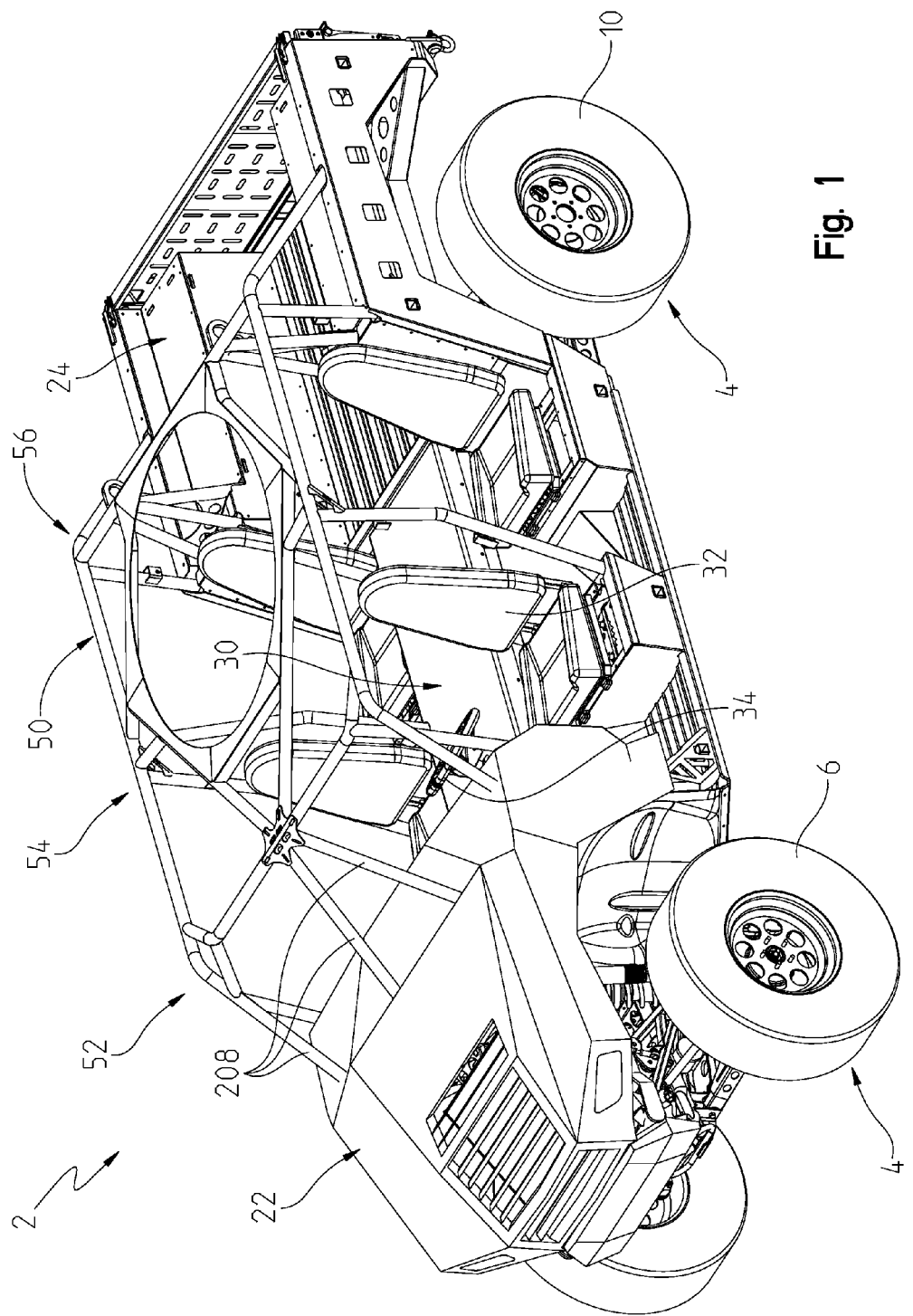
FIG. 1 is a front left perspective view of a vehicle according to the present disclosure.
Figure 2:
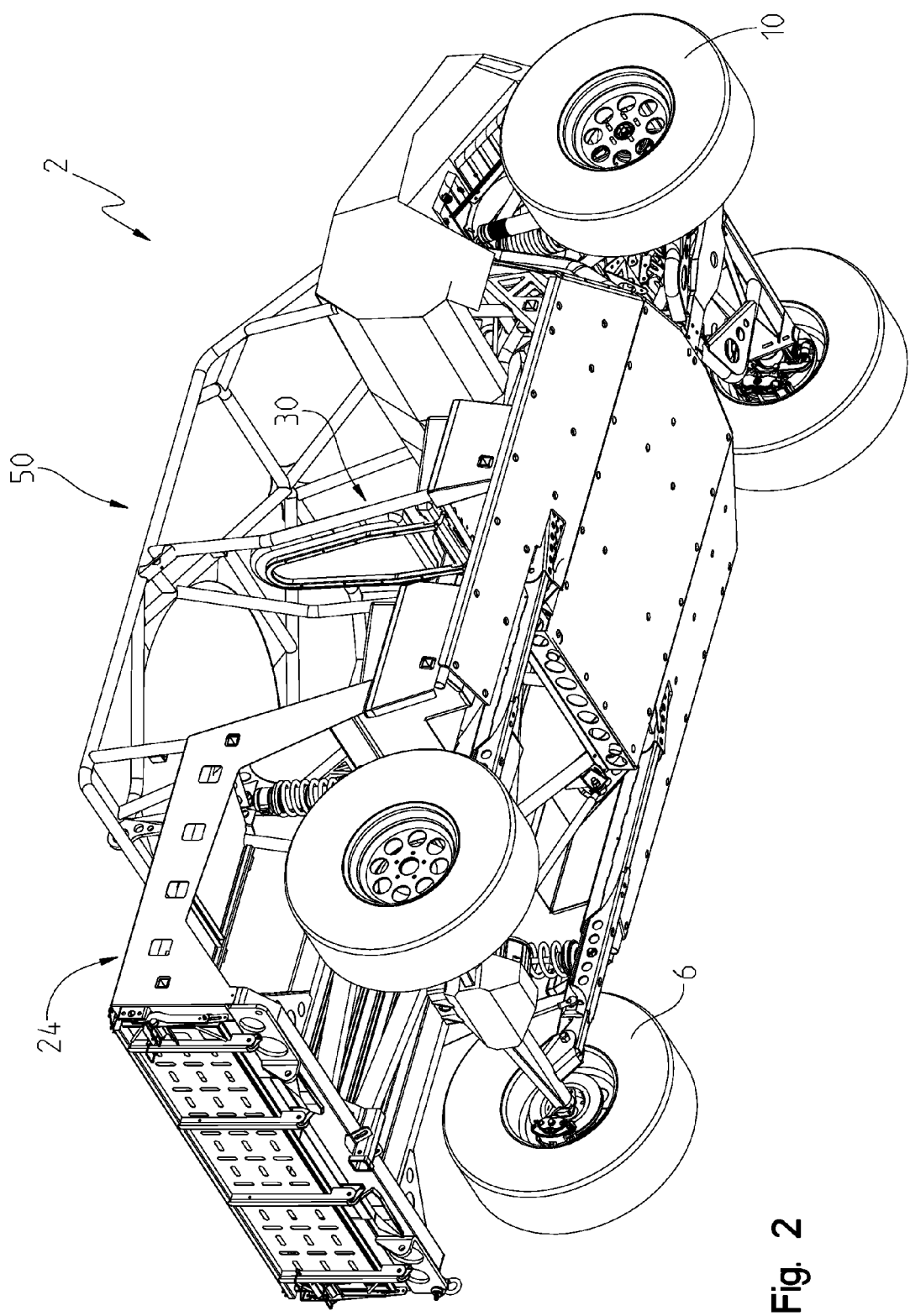
FIG. 2 is a rear right underside perspective view of the vehicle of FIG. 1.
Figure 3:
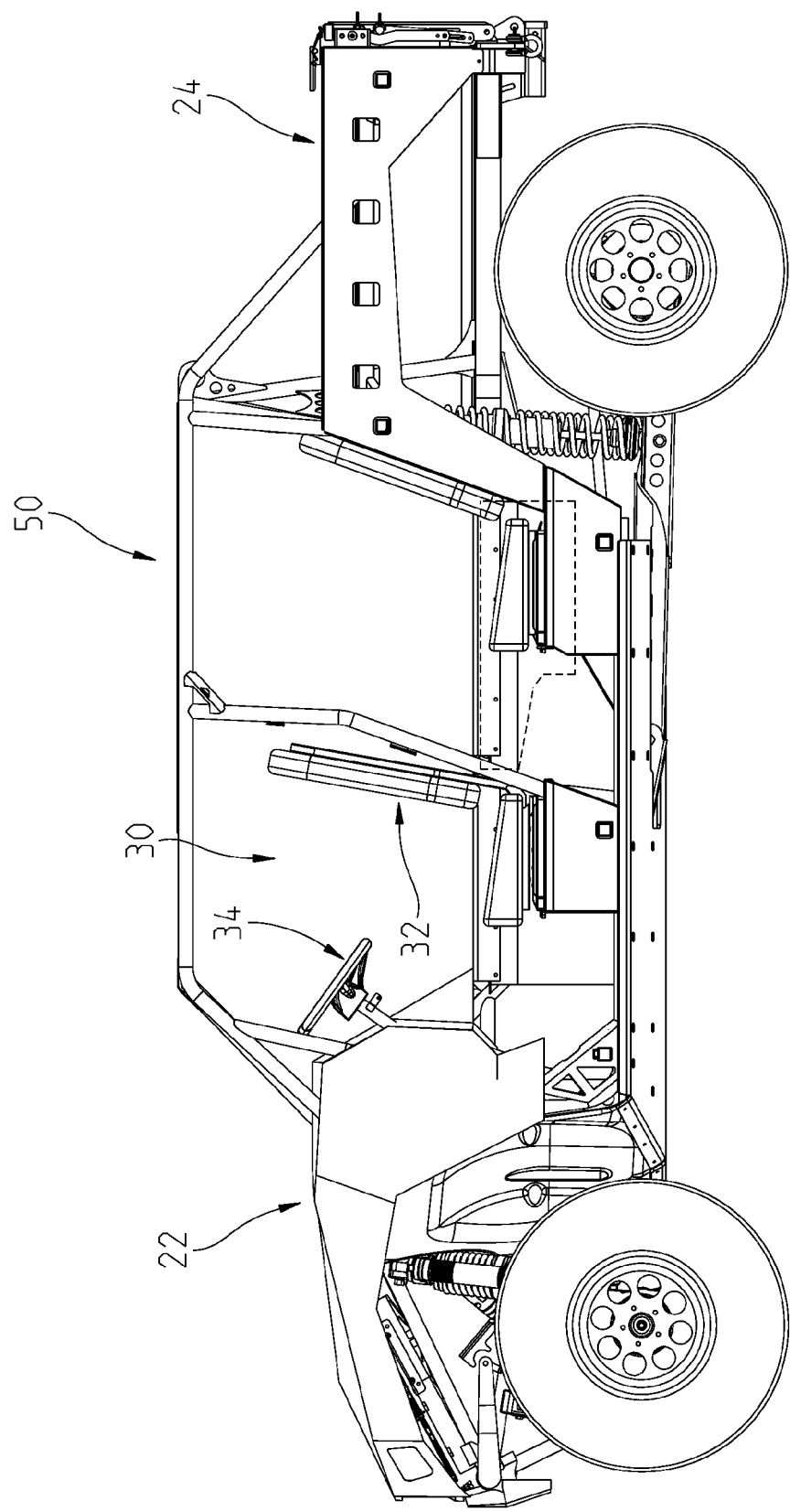
FIG. 3 is a left side view of the vehicle of FIG. 1.
Figure 6:
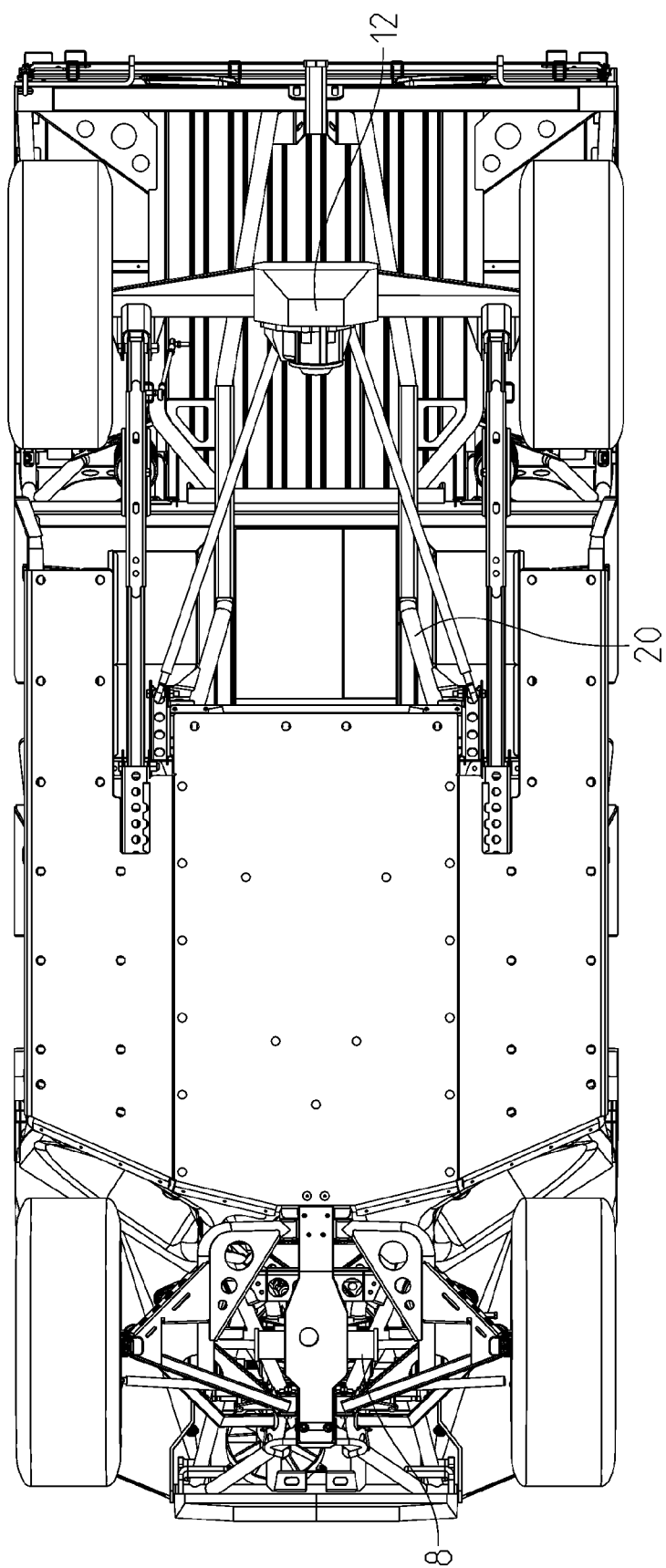
FIG. 6 is a bottom view of the vehicle FIG. 1.
Figure 7:
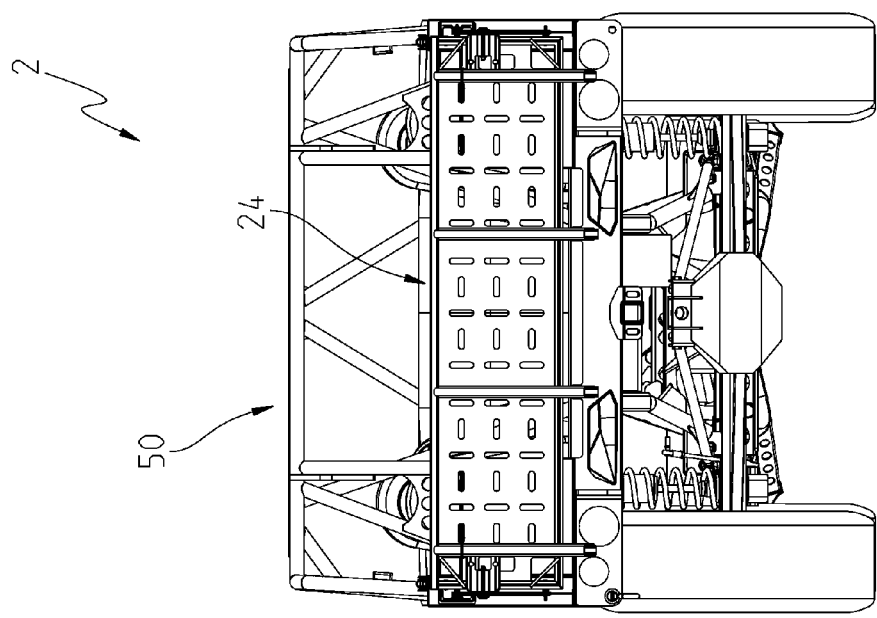
FIG. 7 is a front view of the vehicle of FIG. 1.
Figure 8:
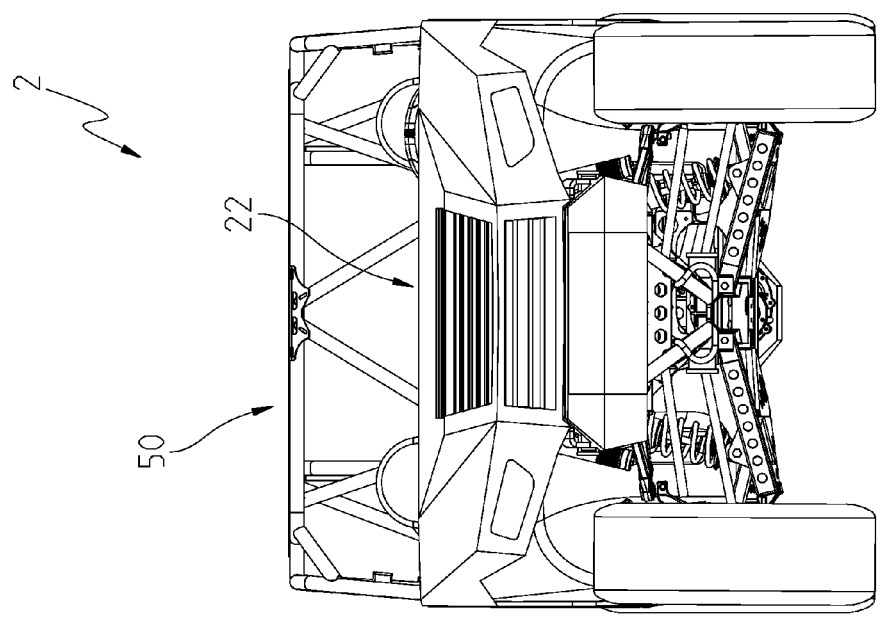
FIG. 8 is a rear view of the vehicle of FIG. 1.

Referring to FIG. 1, an illustrative embodiment of a vehicle 2 is shown. Vehicle 2 as illustrated includes a plurality of ground engaging members 4, illustratively wheels. A first set of wheels 6, one on each side of vehicle 2, generally correspond to a front axle 8 (FIG. 6). A second set of wheels 10, one on each side of vehicle 2, generally correspond to a rear axle 12 (FIG. 6). It should be understood that the vehicle described herein could include any of the components of previous military vehicles as described and depicted in U.S. Pat. No. 7,795,602; U.S. Pat. No. 8,029,021; U.S. Pat. No. 7,717,495; and U.S. Pat. No. 8,205,910; the subject matter of which is incorporated herein by reference.

In one embodiment, one or more of the wheels may be replaced with tracks, such as the Prospector II Tracks available from Polaris Industries, Inc. located at 2100 Highway 55 in Medina, Minn. 55340. As shown, wheels include pneumatic tires mounted on standard steel rims. Alternatively, tires could be non-pneumatic tires as shown in U.S. Pat. No. 8,176,957; U.S. Pat. No. 8,104,524 or in U.S. Patent application 61/611,300, the subject matter of which is incorporated herein by reference.

Figure 4:
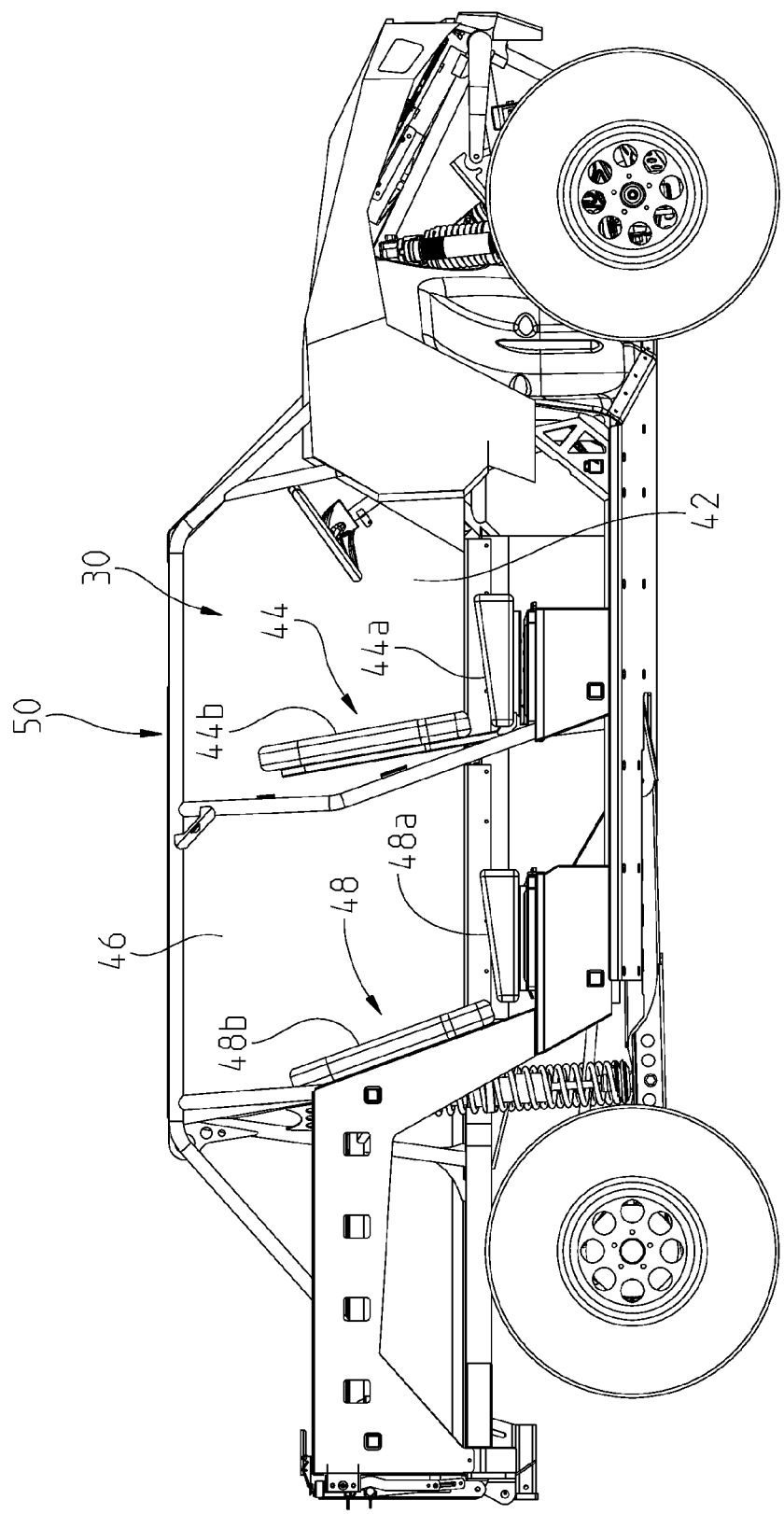
FIG. 4 is a right side view of the vehicle of FIG. 1.
Figure 5:
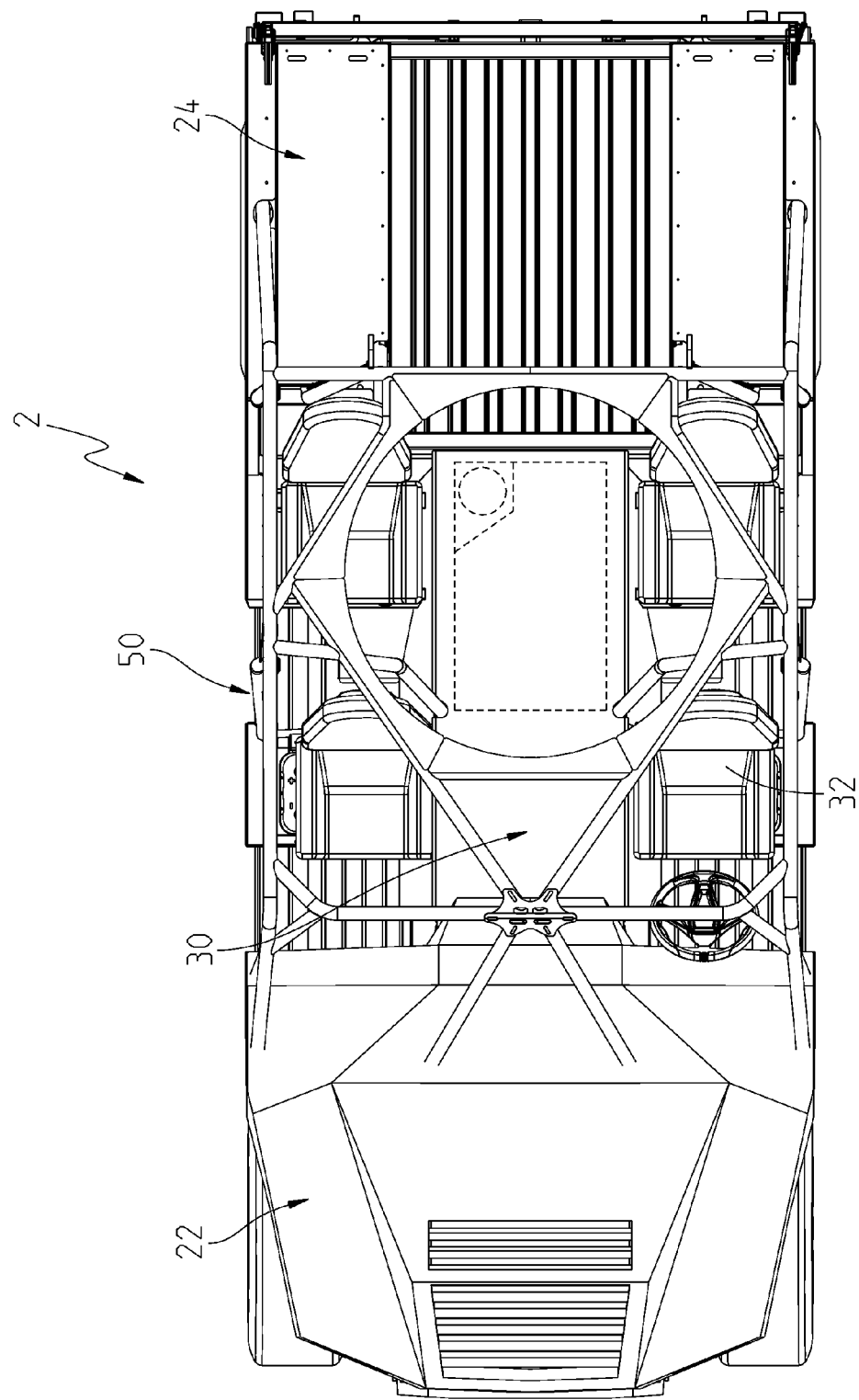
FIG. 5 is a top view of the vehicle of FIG. 1.

Vehicle 2 further includes a frame 20 (FIG. 6) supported by the plurality of ground engaging members 4. Frame 20 supports a vehicle body 22, a rear support area 24 and operator area 30. Vehicle 2 defines operator area 30 which includes seating 32 for one or more passengers; and as described more fully herein, rear support area 24 may include additional seating. As shown in FIG. 4, operator area 30 further includes a front seating area 42 having front seats 44, with seat bottoms 44a and seat backs 44b; and rear seating area 46 having seats 48, with seat bottoms 48a and seat backs 48b. While not shown operator area 30 could further includes passenger seat belts and harnesses for securing the passenger in their respective seats 44, 48, as more fully described in U.S. patent application Ser. No. 12/484,888, incorporated herein by reference. Furthermore, operator area could include side nets, again to add further security to the passengers, as more fully described in U.S. patent application Ser. No. 12/796,495 incorporated herein by reference.

Frame 20 includes a cab frame 50 extending above operator area 30. Cab frame 50 is provided to protect the occupants of operator area 30 if vehicle 2 tips or rolls over. In one embodiment, cab frame 50 may be moveable from a first position protecting operator area 30 to a second position which provides vehicle 2 with a smaller envelope than when cab frame 50 is in the first position. Additional details about exemplary moveable portions are provided in U.S. Pat. No. 7,871,106. In a second embodiment, cab frame 50 may be collapsible from a first position to a second position as shown in U.S. Patent application Ser. No. 61/617,844, the subject matter of which is incorporated herein by reference.

With reference now to FIGS. 9-12, frame assembly 20 will be described in greater detail. Frame assembly 20 includes a front frame portion 62, an intermediate frame portion 64, and a rear frame portion 66. In addition to structurally supporting, rigidifying, and defining vehicle 2, each of front frame portion 62, intermediate frame portion 64, and rear frame portion 66 is configured to support accessories and various components of vehicle 2.

Figure 9:
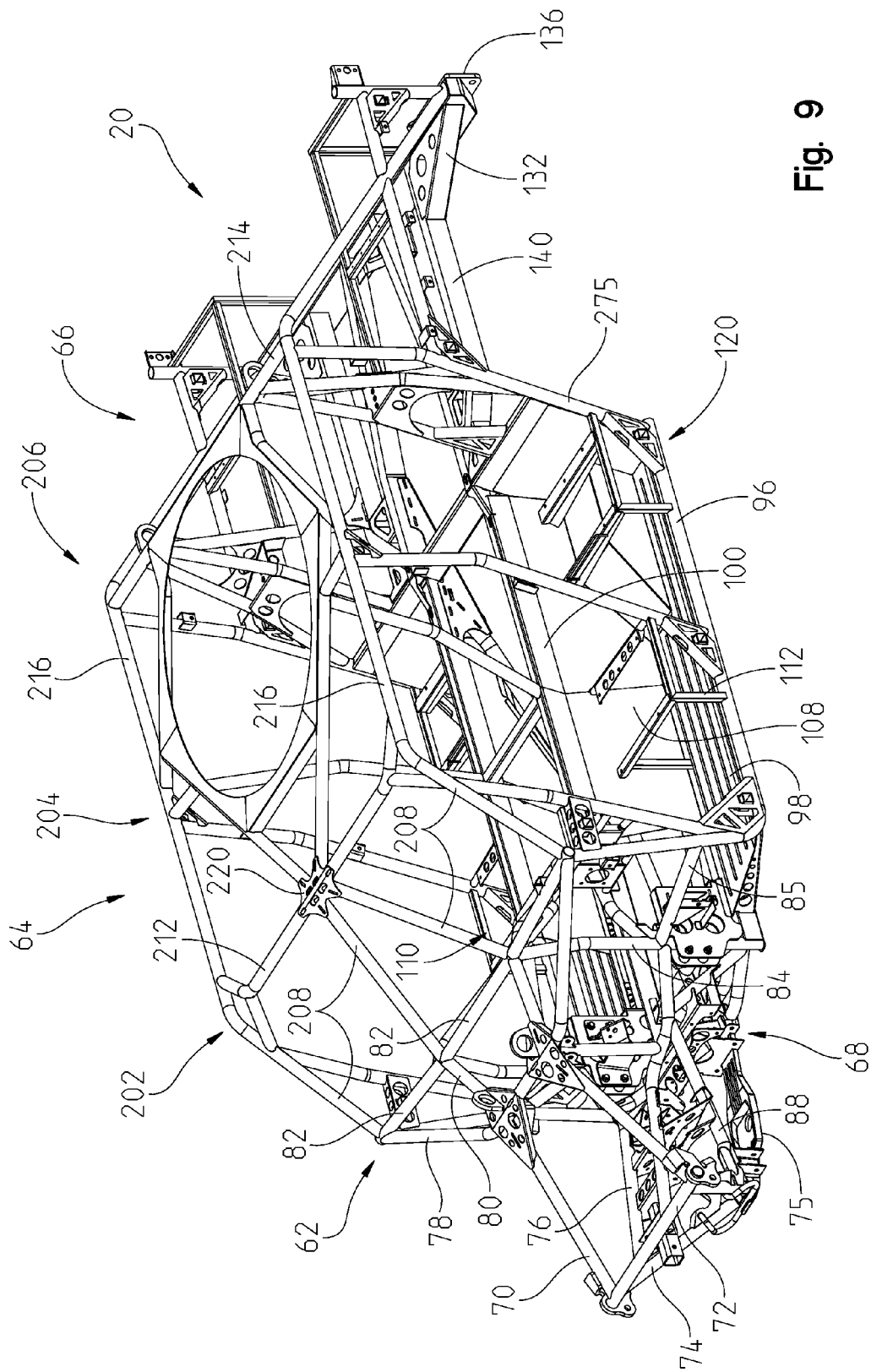
FIG. 9 is a front left perspective view of a vehicle frame according to the present disclosure.

As shown in FIG. 9, front frame portion 62 is defined by a plurality of frame members, which may be comprised of any structurally supportive material, for example polymeric materials, metallic materials, such as steel, aluminum, and/or any other material configured to support vehicle 2 and its various components and systems positioned at front frame portion 62. For example, front frame portion 62 may be at least partially comprised of a high-strength steel material, such as chromoly. Additionally, the frame members defining front frame portion 62 may be coupled together with fasteners, such as welds, rivets, bolts, adhesive, or any other type of fastener.

Front frame portion 62 includes upper front members 70 and a cross member 72 extending therebetween. Illustratively, upper front members 70 and/or cross member 72 may be comprised of a high-strength steel material (e.g., chromoly). Upper front members 70 also are coupled to lower front members 74. Lower front members 74 are coupled to a mounting plate 75, which supports a portion of the drivetrain, a portion of the steering assembly, and/or a portion of the front suspension assembly. Mounting plate 75 extends rearwardly to couple with a removable portion 68 of frame assembly 20. Removable portion 68 provides lower access to frame assembly 20 for assembling, disassembling, and servicing drivetrain assembly, as detailed in U.S. Provisional Patent Application Ser. No. 61/703,383, filed Sep. 20, 2012, entitled "VEHICLE"; U.S. Provisional Patent Application Ser. No. 61/822,113, filed May 10, 2013, entitled "VEHICLE"; U.S. Utility patent application Ser. No. 14/031,950, filed Sep. 19, 2013, entitled "VEHICLE"; and PCT Patent Application PCT/US2013/061002; the complete disclosures of which are expressly incorporated herein by reference.

Positioned above removable portion 68 and mounting plate 75 are front upper longitudinal frame members 76. Front upper longitudinal frame members 76 are coupled to cross member 72 and extend rearwardly to couple with intermediate frame portion 64. More particularly, front upper longitudinal frame members 76 bend outwardly rearwardly. Upstanding members 84 may be used to couple front upper longitudinal frame members 76 to upper front members 70.

A pair of front lower longitudinal frame members 88 are supported below front upper longitudinal frame members 76. The forward ends of front lower longitudinal frame members 88 are coupled to lower front members 74 and the rearward ends of front lower longitudinal frame members 88 are coupled to front upper longitudinal frame members 76.

Front frame portion 62 further includes frame members 78 and frame members 80. As shown in FIG. 9, frame members 78 and 80 are generally coupled to upper front members 70 and extend rearwardly to couple with intermediate frame portion 64. Upstanding members 84 may be used to couple front upper longitudinal frame members 76 to frame members 80. Additionally, front frame portion 62 includes cross members 85, which are coupled to upstanding members 84 and front upper longitudinal frame members 76. Cross members 85 also are coupled to intermediate frame portion 64, as detailed further herein.

Figure 10:
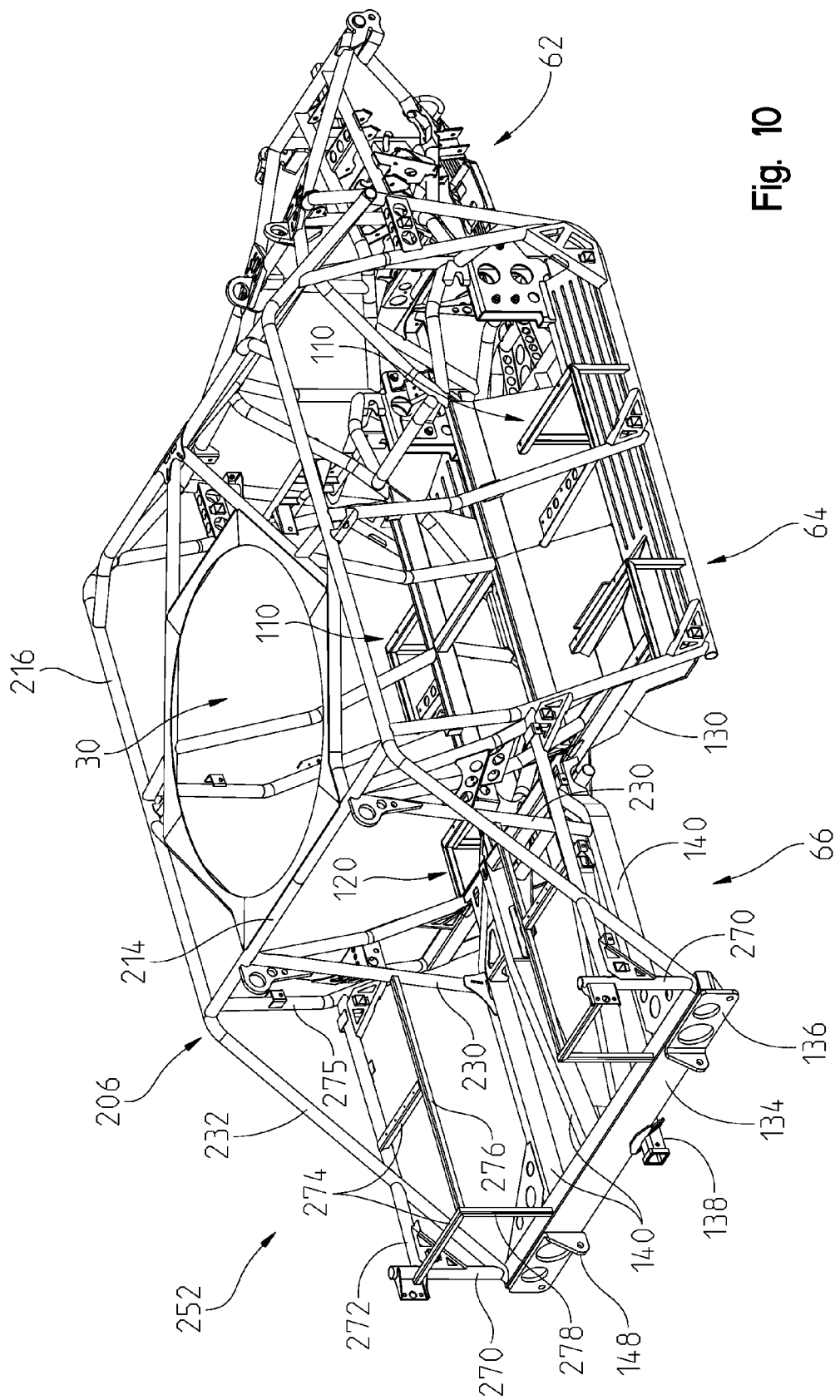
FIG. 10 is a rear right perspective view of the frame of FIG. 9.

Referring to FIGS. 9-10, intermediate frame portion 64 is positioned rearward of front frame portion 62 and is coupled thereto with frame members 78, front upper longitudinal frame members 76, upstanding members 84, cross members 85, and removable portion 68. More particularly, at least one cross member 82 of intermediate frame portion 64 is coupled to frame members 78, 80 and upstanding members 84 of front frame portion 62. Cross members 82 of intermediate frame portion 64 also are coupled to cab frame assembly 50, as detailed herein.

Cross members 82 also are coupled to longitudinal frame members 96 of intermediate frame portion 64. As shown in FIG. 9, longitudinal frame members 96 include an upstanding portion coupled to cross members 82 and a longitudinally-extending portion. Longitudinally-extending portion of longitudinal frame members 96 generally defines an outer lower boundary of frame assembly 20 and are positioned laterally outward of floor boards 98. Illustratively, vehicle 2 may include one floor board 98 on each side of vehicle 2. Alternatively, floor boards 98 may be divided into multiple portions and coupled to frame assembly 20 with conventional fasteners, such as welds, rivets, bolts, and/or adhesive.

Figure 11:
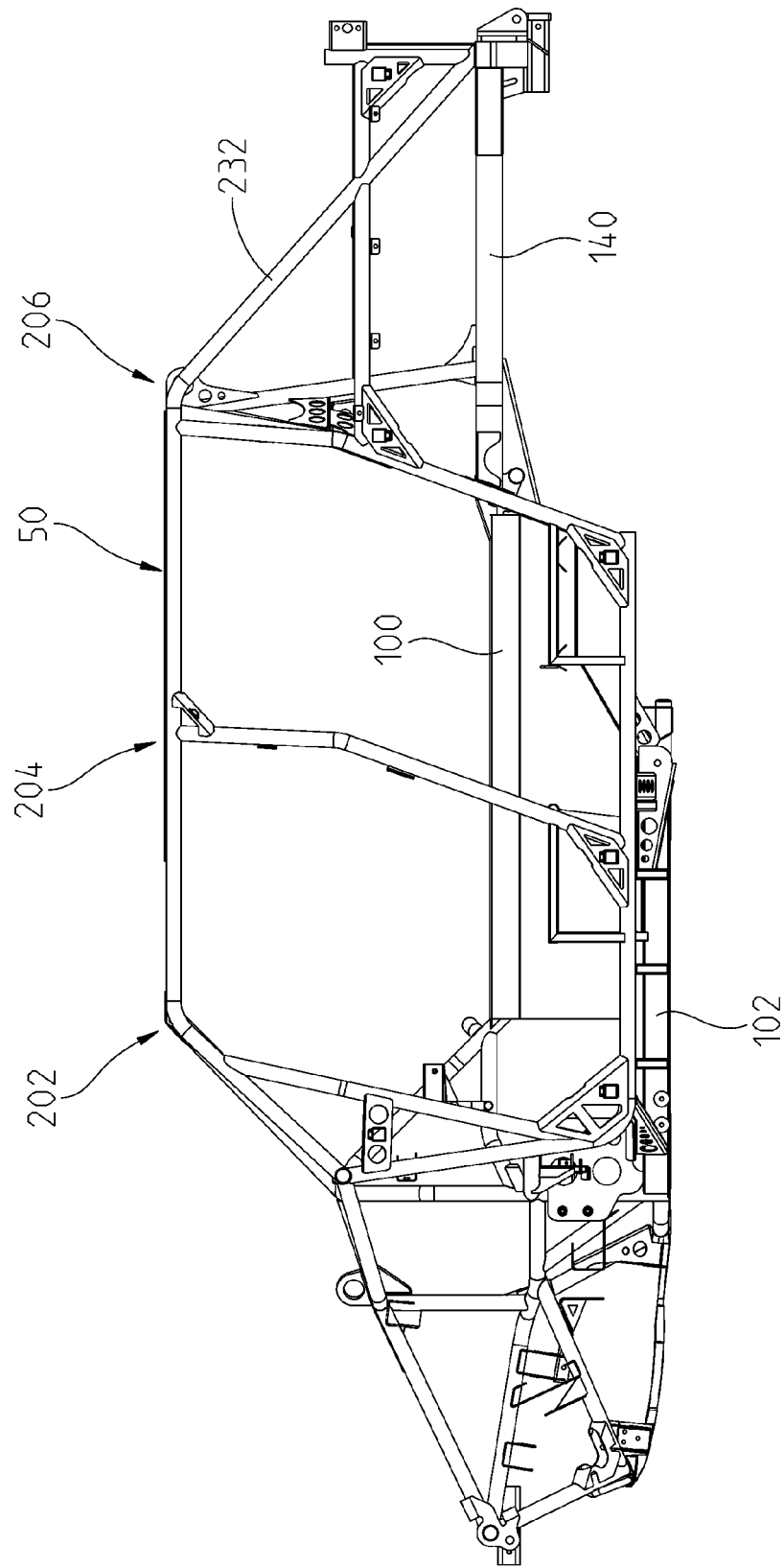
FIG. 11 is a left side view of the vehicle frame of FIG. 9.
Figure 12:
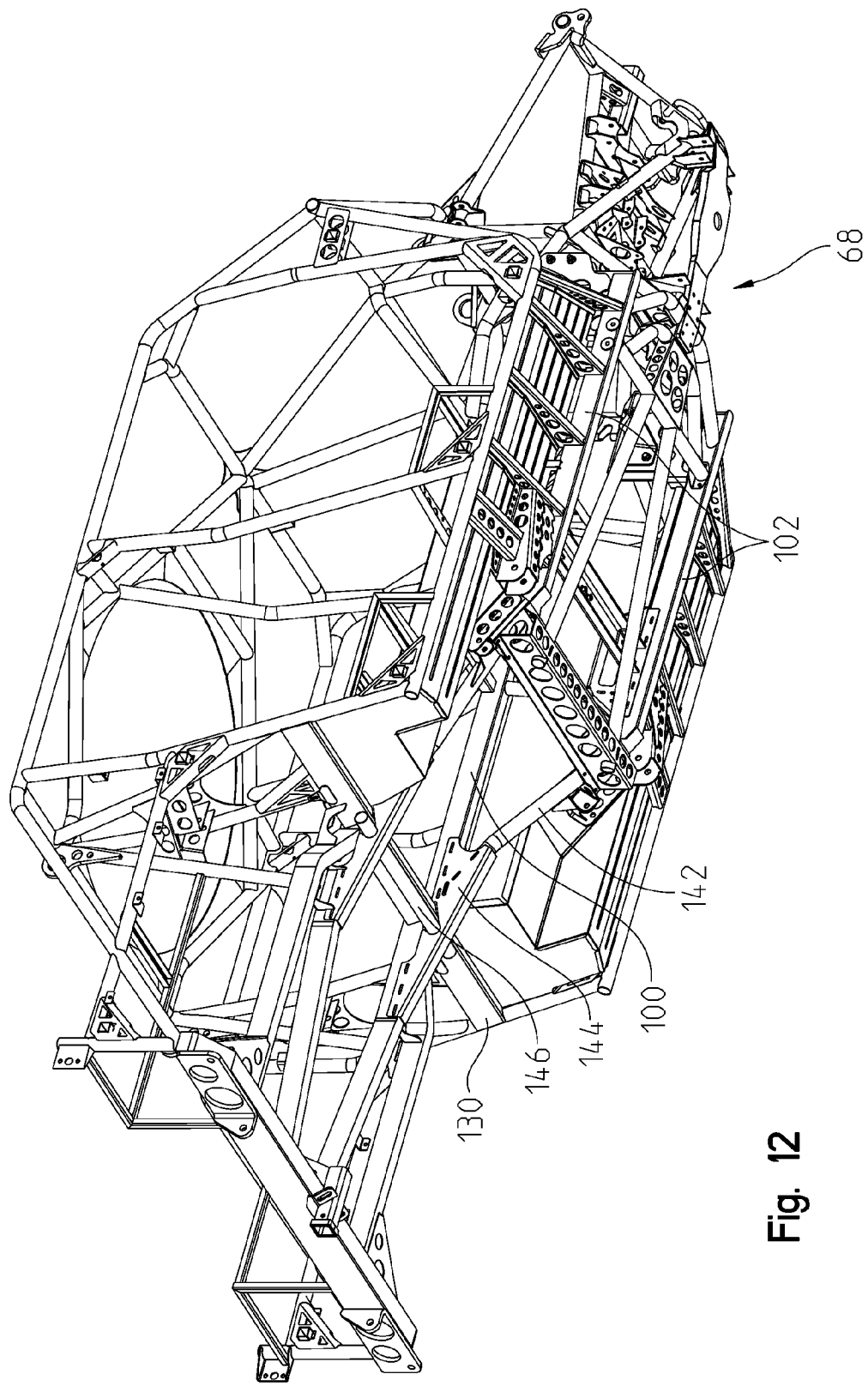
FIG. 12 is an underside perspective view of the vehicle frame of FIG. 9.

As shown, intermediate frame portion 64 includes a plurality of frame rails, illustratively upper frame rails 100 and lower frame rail 102 (FIG. 11). Upper frame rails 100 are positioned generally above lower frame rails 102, and both upper and lower frame rails 100, 102 are generally parallel to a longitudinal axis of vehicle 2. More particularly, as shown best in FIG. 12, lower frame rails 102 are positioned below and laterally outward from upper frame rails 100.

Lower frame rails 102 are coupled to removable portion 68 of frame assembly 20, as detailed further herein. Upper and lower frame rails 100, 102 define a tunnel area for housing and supporting at least a portion of drivetrain assembly. The lateral offset of lower frame rails 102 relative to upper frame rails 100 is designed to accommodate the minimum width of drivetrain assembly. Walls 108 may be coupled to upper and lower frame rails 100, 102 and extend therebetween in order to shield operator area 30 from the drivetrain assembly. More particularly, upper frame rails 100 define an inner boundary of front and rear seating sections 42, 46 and, therefore, walls 108 shield the operator and passengers within operator area 30 from the heat, noise, vibration, and movement of the drivetrain assembly.

As shown in FIGS. 9 and 10, intermediate frame portion 64 further includes front seat frames 110 and rear seat frames 120. Front seat frames 110 are positioned within front seating section 42. Front seat frames 110 support operator and front passenger seats 44 in a side-by-side configuration. Front seat frames 110 are configured to couple with seat bottoms 44a of operator and front passenger seats 44. At least front passenger seat may be removably coupled to front seat frames 110. Similarly, rear seat frames 120 are positioned within rear seating section 46.

As shown in FIG. 10, rear frame portion 66 is generally positioned rearward of intermediate frame portion 64 and supports rear support area 24. Rear frame portion 66 includes a cross brace 130, brackets 132, a tailgate support member 134, rear plates 136, an accessory mount, illustratively a trailer hitch 138, a plurality of rear longitudinal support members 140, frame members 142, braces 144, and a cross bar 146. As shown best in FIG. 10, cross brace 130 is coupled to cab frame assembly 50 and is positioned rearward of operator area 30. Cross brace 130 generally spans the width of cab frame assembly 50 and is coupled to rear longitudinal support members 140.

Rear longitudinal support members 140 extend rearwardly from cross brace 130 and are configured to support a cargo surface or platform, as detailed further herein. A forward end of rear longitudinal support members 140 is coupled to cross brace 130 and a rearward end of rear longitudinal support members 140 is coupled to tailgate support member 134.

Tailgate support member 134 generally defines the rearward boundary of frame assembly 20 and is coupled to rear longitudinal support members 140 with brackets 132 (FIG. 9). Tailgate support member 134 may be integrally formed with, or is otherwise coupled to, rear plates 136 which may support rear lights, such as tail lights, turn signals, reverse lights, and auxiliary lights, on rear frame portion 66. Rear plates 136 also include integral accessory mounts 148. Illustratively, rear frame portion 66 includes at least two accessory mounts 148 integrally coupled to and/or formed with rear frame portion 66.

Additionally, tailgate support member 134 may further include integrated couplings for supporting a rear bumper on vehicle 2. Because the rear bumper is supported by couplings that are integrally formed with rear frame portion 66, loads and forces applied to the rear bumper may be directly transmitted to frame assembly 20, thereby increasing the structural integrity of vehicle 2.

Referring to FIGS. 9-11, cab frame assembly 50 is shown. Cab frame assembly 50 includes a front portion 202, an intermediate portion 204, and a rear portion 206. Portions 202, 204, and 206 of cab frame assembly 50 may be integrally coupled together or may be coupled together with conventional fasteners, such as welds, rivets, bolts, and/or adhesive. Cab frame assembly 50 may be comprised of a structural material, such as a metallic or polymeric material, for example steel.

Front portion 202 of cab frame assembly 50 includes a plurality of frame members 208 (FIG. 9) coupled to cross members 82 of intermediate frame portion 64. Illustratively, vehicle 2 includes four frame members 208 extending upwardly and rearwardly from cross members 82. More particularly, frame members 208 include outer and inner frame members extending from cross members 82.

Intermediate portion 204 of cab frame assembly 50 is generally positioned rearward of front portion 202. Intermediate portion 204 includes a front cross member 212, a rear cross member 214, and longitudinally-extending members 216 extending therebetween. Longitudinally-extending members 216 of cab frame assembly 500 define an outer boundary of cab frame assembly 50. Illustratively, rear cross member 214 is coupled to longitudinally-extending members 216. Similarly, front cross member 212 also is coupled to longitudinally-extending members 216 and is further coupled to mounting plate 220. In one embodiment, front cross member 212 is a single member extending between longitudinally-extending members 216. Alternatively, front cross member 212 may be comprised of at least two separate members coupled together. For example, the various members of front cross member 212 may be coupled together at mounting plate 220.

As shown in FIGS. 10-11, rear portion 206 of cab frame assembly 50 includes upstanding members 230 and diagonal members 232. Upstanding members 230 are coupled to rear longitudinal support members 140 of rear frame portion 66 and extend upwardly therefrom. Additionally, upstanding members 230 are angled forwardly relative to rear longitudinal support members 140 in order to couple with rear cross member 214 of cab frame assembly 50. Diagonal members 232 of rear portion 206 of cab frame assembly 50 are coupled to rear cross member 214 and/or longitudinally-extending members 216 and are angled rearwardly and downwardly therefrom in order to couple with tailgate support member 134.

Figure 13:
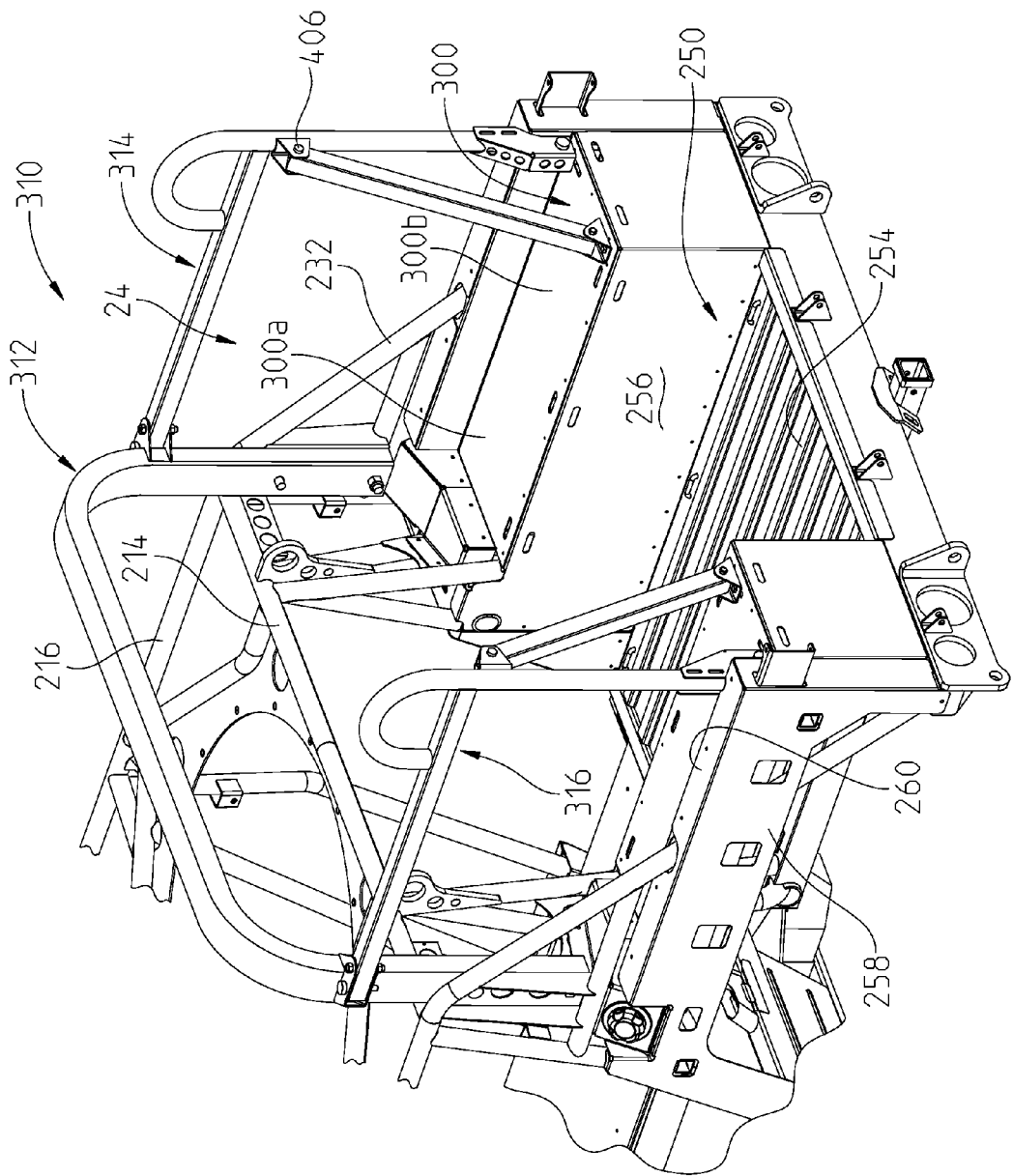
FIG. 13 is a rear left perspective view of the vehicle foldable frame.
Figure 14:
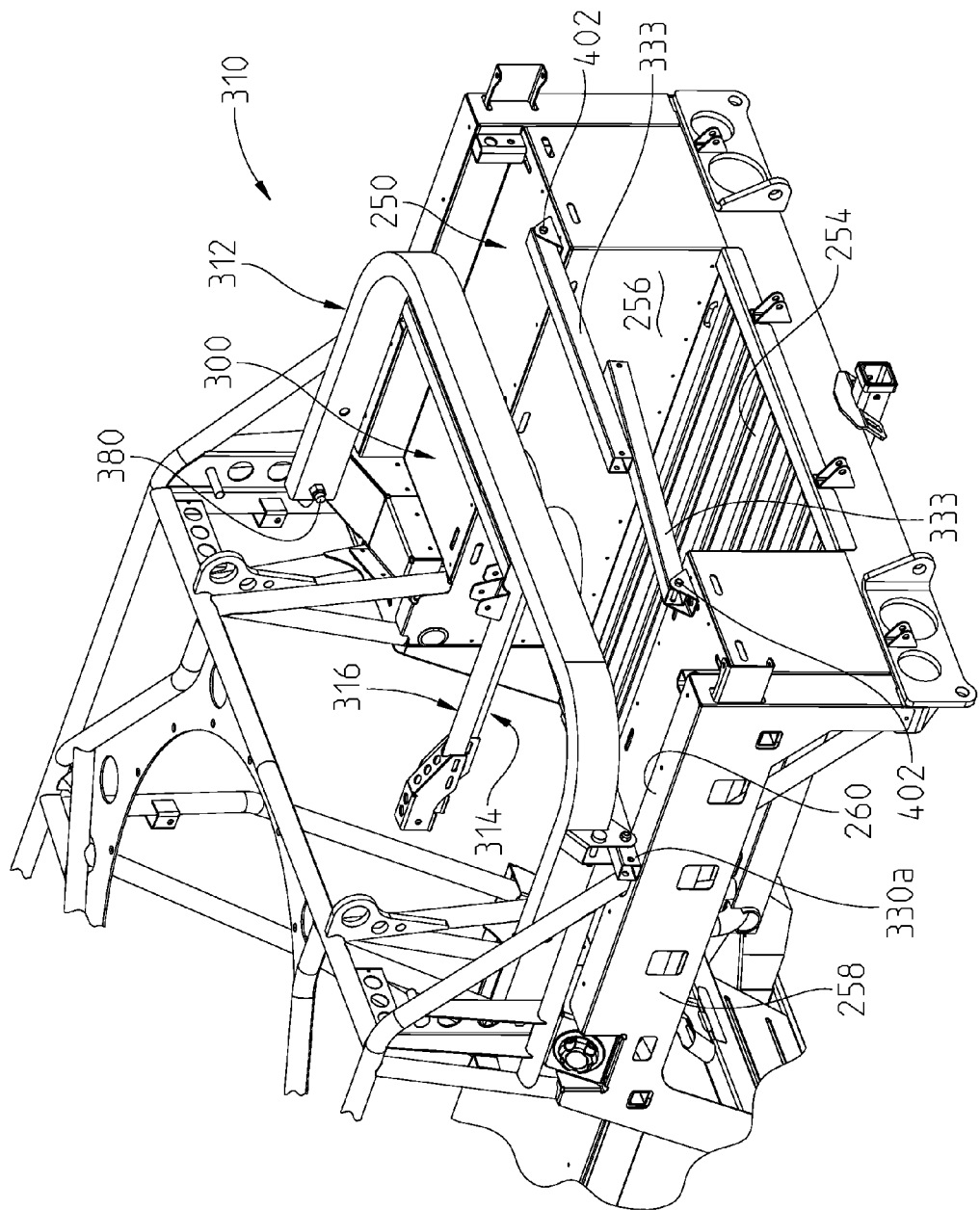
FIG. 14 is a view similar to that of FIG. 13, showing the frame in the collapsed position.

Referring now to FIGS. 13 and 14, rear cargo bed assembly 250 is shown and includes cargo bed frame assembly 252 (FIG. 10), a cargo bed surface or platform 254, inner walls 256, outer walls 258 and upper wall 260. The width of rear cargo bed assembly 250, including cargo bed frame assembly 252 and cargo bed platform 254, may be approximately 1850-1950 mm, and illustratively is approximately 1880 mm. Cargo bed frame assembly 252 is shown in FIG. 10 and includes outer upstanding members 270, outer longitudinal members 272, braces 274, rear upstanding pillar members 275, inner longitudinal members 276, and inner upstanding members 278. Outer longitudinal members 272 are coupled to outer upstanding members 270, braces 274, diagonal members 232, and rear upstanding pillar members 275. Outer and inner upstanding members 270 and 278 are coupled to tailgate support member 134 and braces 274.

Cargo bed frame assembly 252 defines spaces for cargo and other components of vehicle 2. For example, outer upstanding members 270, outer longitudinal members 272, braces 274, inner longitudinal members 276, and inner upstanding members 278 define two raised spaces of rear cargo bed assembly 250. Inner and outer walls 256, 258 are coupled to outer upstanding members 270, outer longitudinal members 272, braces 274, inner longitudinal members 276, and inner upstanding members 278 to define storage containers on rear cargo bed assembly 250. Cargo bed platform 254 is positioned between these two storage containers.

Figure 15:
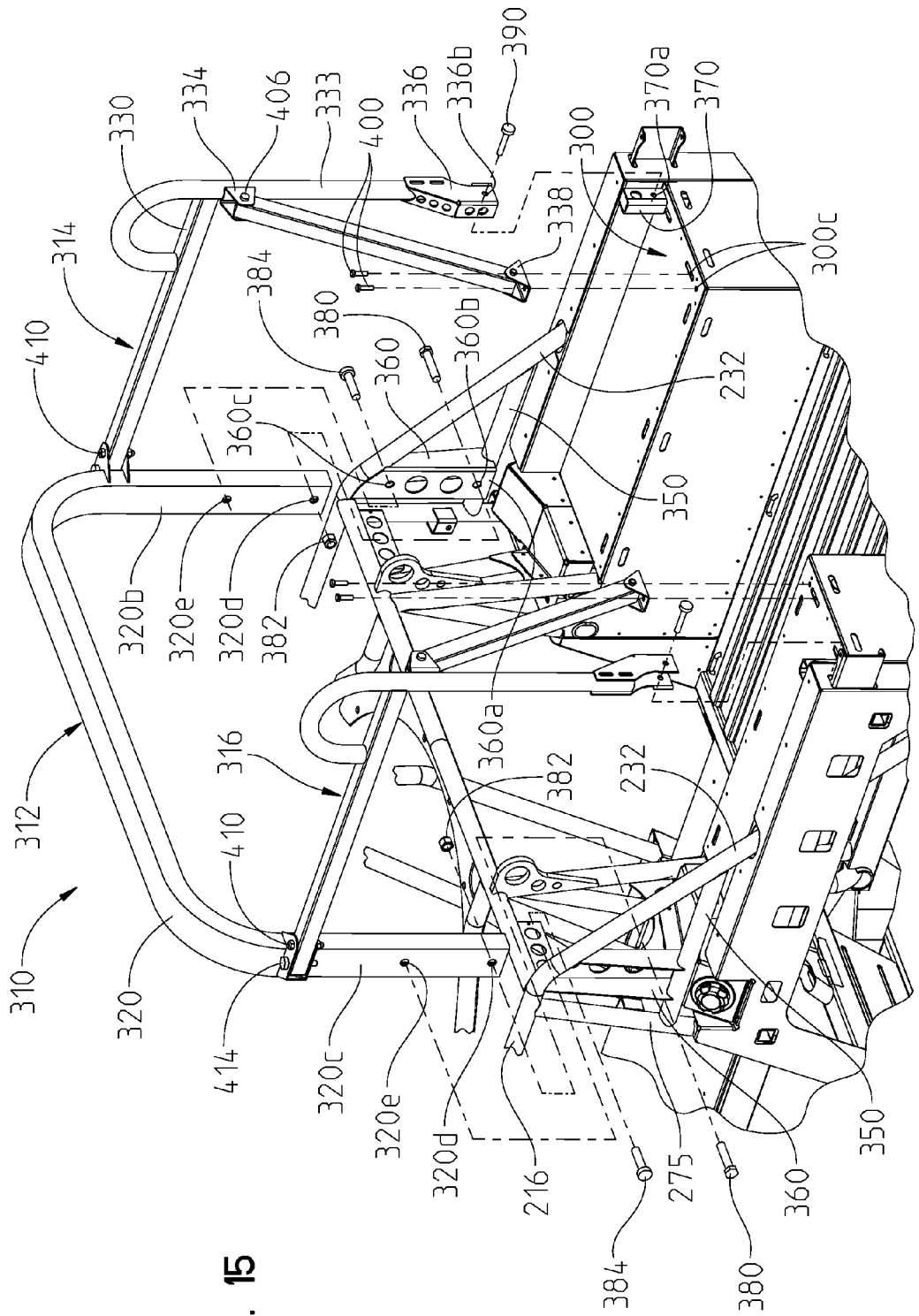
FIG. 15 is a view similar to that of FIG. 13, showing the foldable frame exploded from the vehicle.
Figure 16:
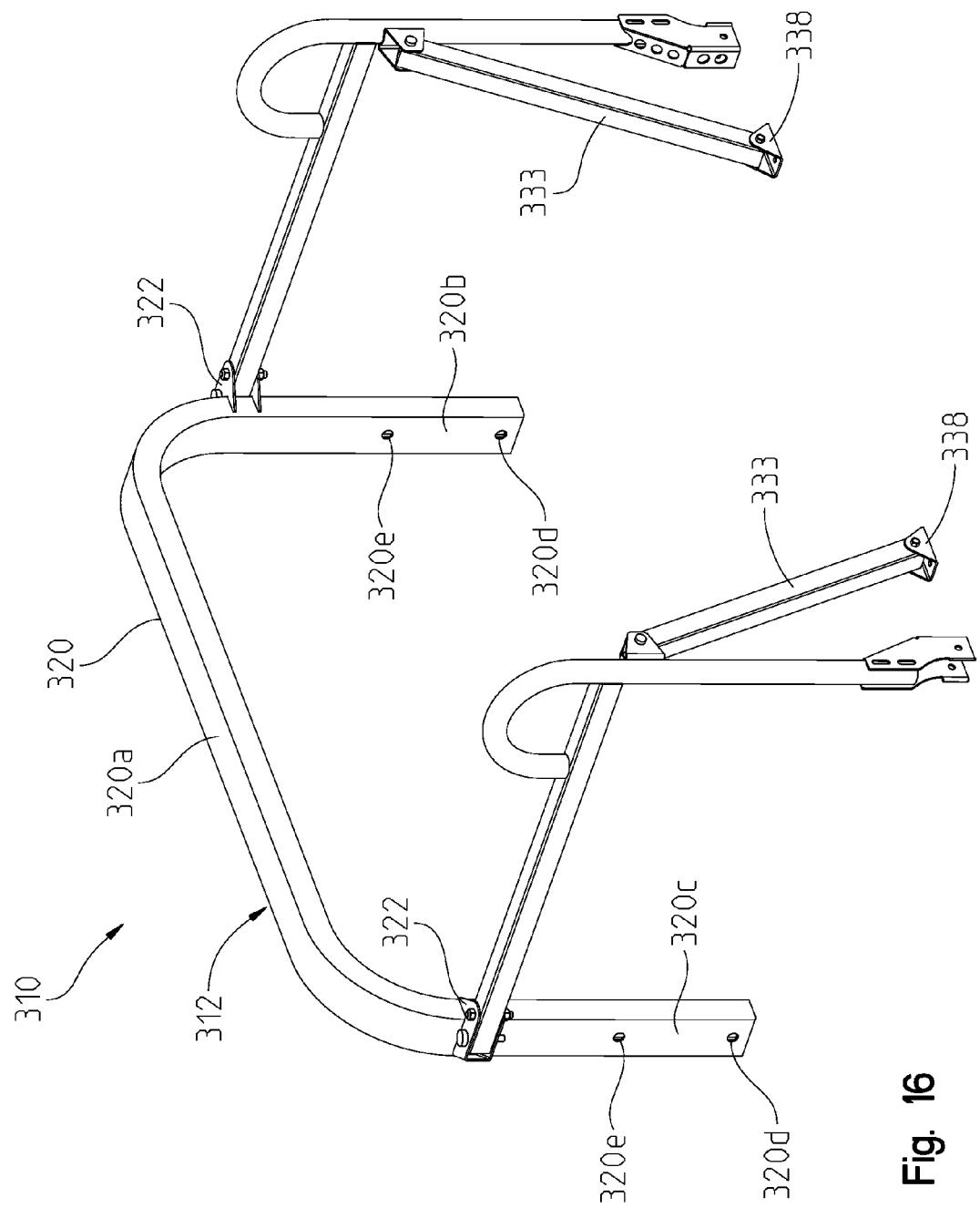
FIG. 16 is a perspective view of the foldable frame.
Figure 17:
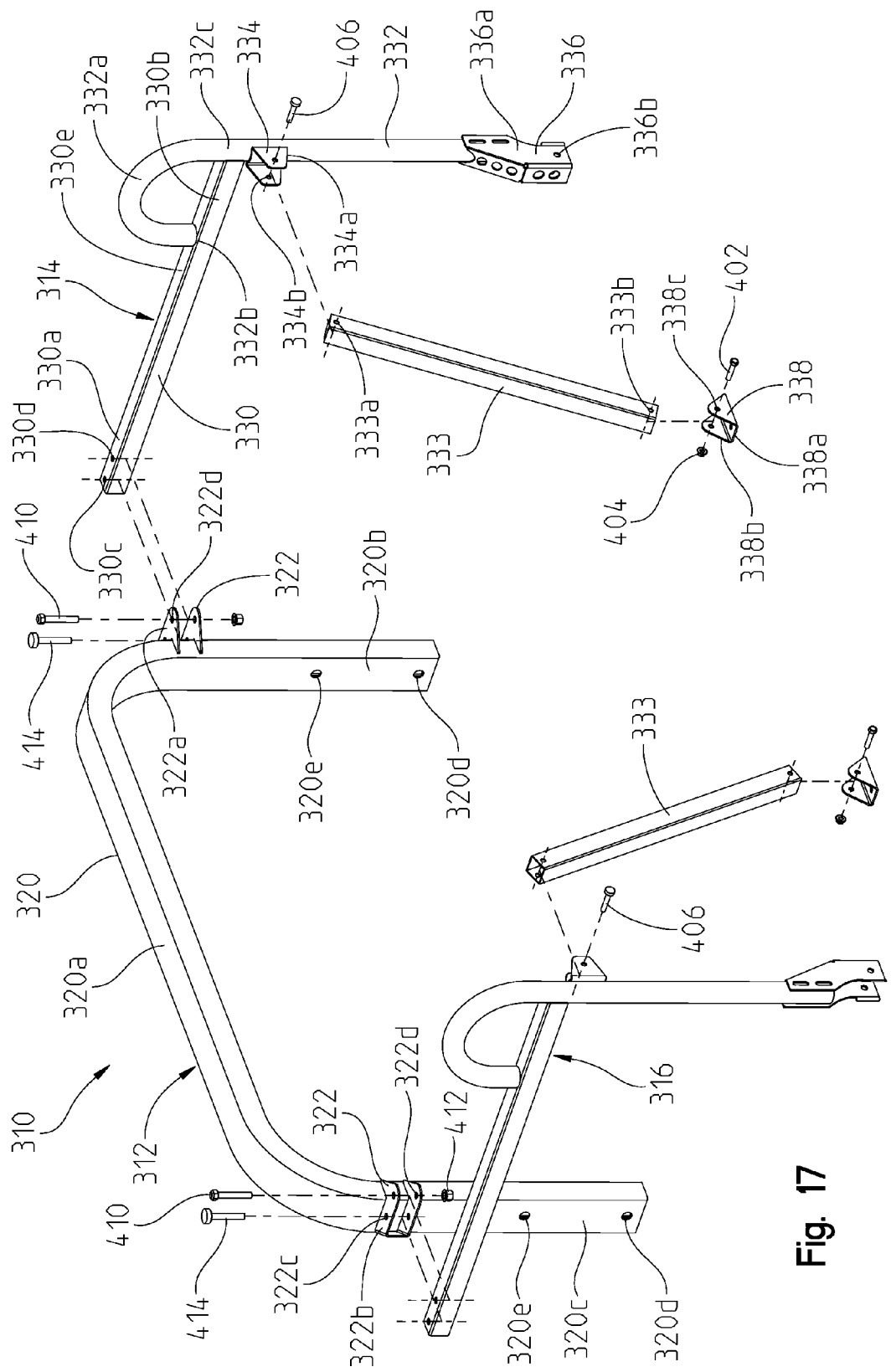
FIG. 17 is an exploded view of the foldable frame.

As shown best in FIG. 13, rear support area 24 further includes seating for four additional passengers. For example, rear support area 24 defines a rear and third seating area comprising seating platform 300 supported by braces 274, 276 and defining seating positions 300a and 300b. A rear cab frame is defined at 310 and includes a laterally extending support 312 and longitudinally extending supports 314, 316. As supports 314, 316 are mirror image of each other, only one will be described in detail. The rear cab frame 310 can be positioned in the configuration of FIG. 13 to provide support over the tops of the rear passenger's heads, and the entire rear cab frame 310 is collapsible into the position of FIG. 14, to provide lower profile height for shipping. With reference now to FIGS. 15-17, cab frame 310 will be described in greater detail.

With reference first to FIGS. 16-17, laterally extending support 312 generally includes a U-shaped frame 320 and brackets 322. U-shaped frame 320 is inverted and has a horizontal portion 320a and vertical portions 320b, 320c. Each of vertical portions 320b, 320c includes lower apertures 320d and upper apertures 320e. Brackets 322 include parallel plates 322a and 322b each having aligned apertures 322c and 322d. As shown best in FIG. 17, plate portion 322a and 322b extend rearwardly from U-shaped frame member 320 which positioned apertures 322d rearwardly from U-shaped frame portion 320, as described herein.

Longitudinally extending support 314 generally includes a longitudinally extending frame member 330, generally vertically extending frame member 332 and upright support 333. Frame member 330 includes a forward end 330a and a rearward end 330b. Forward end 330a includes apertures 330c and 330d, which as should be appreciated, align with apertures 322c and 322d. It should also be appreciated that plate portions 322a and 322b are spaced apart to provide a sliding fit of frame member 330 therein as described herein. Frame member 332 is generally configured as an inverted J-shaped member, having an upper end 332a extending above frame member 330 with an end 332b coupled to a top edge 330e of frame member 330. Frame member 332 further includes a generally vertical extending member 332c which is coupled to rearward end 330b of frame member 330. Support 314 further comprises brackets 334 and 336 coupled to vertically extending portion 332c of frame member 332. Bracket 334 includes plate portions 334a having apertures 334b extending therethrough. Bracket 336 includes plate portions 336a and apertures 336b extending therethrough. As shown best in FIG. 17, support member 314 further includes bracket 338 having a lower plate portion 338a and spaced apart plates 338b each having an aperture 338c. Upright 333 includes apertures at 333a and 333b.

With reference now to FIG. 15, rear cab frame 310 further comprises frame tube 350 coupled between frame tubes 232 and 275. Brackets 360 are coupled between frame tubes 216, 232, and 350. Bracket 360 includes a plate portion 360a having apertures at 360b and 360c therethrough. It should be appreciated that apertures 360b align with apertures 320d and apertures 320c align with apertures 320e on U-shaped frame member 312. It should also be appreciated that brackets 360 are laterally spaced apart so as to allow a sliding fit between vertical portions 320b and 320c, as described herein. FIG. 15 also shows frame tube 370 extending upwardly through plate 300 and having apertures at 370a. With reference now to FIGS. 15-17, the attachment and operation of rear cab frame 310 will be described.

With respect first to FIG. 15, U-shaped frame member 320 is coupled to brackets 360 by way of fasteners 380, 382, which is intended to be a semi-permanent connection. That is, while fasteners 380, 382 include bolts and nuts, respectively, these fasteners are not intended to be removed for operation of rear cab frame 310. As shown, fasteners 380 extend through apertures 360b of brackets 360, and through apertures 320d of U-shaped frame member 320. As further described herein, fastener 380 becomes a pivot axis for U-shaped frame member 320. FIG. 15 also shows locking pins 384 which are positioned through apertures 360c of bracket 360, and through apertures 320e of U-shaped frame member 320. Locking pins are intended to be removable, and therefore have a locking feature such as a retaining clip or circlip (not shown) to retain the locking clip 384 in position.

As also shown in FIG. 15, brackets 336 align with frame member 370 with apertures 336b aligning with apertures 370a. Locking clip 390 may then be positioned through apertures 336b and 370a to couple bracket 336 to frame member 370. Locking pin 390 is similar to locking pin 384 and is removable. With reference still to FIG. 15, fasteners 400 may be positioned through bracket 338 and coupled to threaded apertures 300c. Upright frame member 333 is coupled to bracket 338 by way of fasteners 402, 404 (FIG. 17) where fasteners 402 and 404 are intended to provide a semi-permanent attachment of frame tube 333 to bracket 338 as described above. Frame tube 333 is coupled to bracket 334 by way of a removable locking pin 406. Finally, frame member 330 is coupled to bracket 332 by way of fasteners 410, 412, (FIG. 17) where fastener 410 extends through apertures 322d and 330d to retain frame member 330 to U-shaped frame member 320 in a semi-permanent manner. Locking pins 414 extend through apertures 322c and 330c and are removably coupled thereto as described above.

The operation of rear cab frame 310 will now be described. The fully upright position of rear cab frame 310 is shown in FIG. 13. To move the rear cab frame 310 to the folded position of FIG. 14, locking pins 406 are first removed which allows upright frame members 333 to rotate about fasteners 402, to the position shown in FIG. 14. Locking pins 390 and 414 (FIG. 15) are then removed which allows frame members 330 to rotate about their respective fasteners 410. This allows supports 314, 316, to rotate against U-shaped frame member 320 whereupon locking pins 384 (FIG. 15) may be removed, and the combination of supports 312, 314, and 316, may be rotated about fasteners 380 to the position shown in FIG. 14. As members 330 rotate about fasteners 410, forward ends 330a rest upon upper wall 260 when in the collapsed position as shown in FIG. 14.

Figure 18:
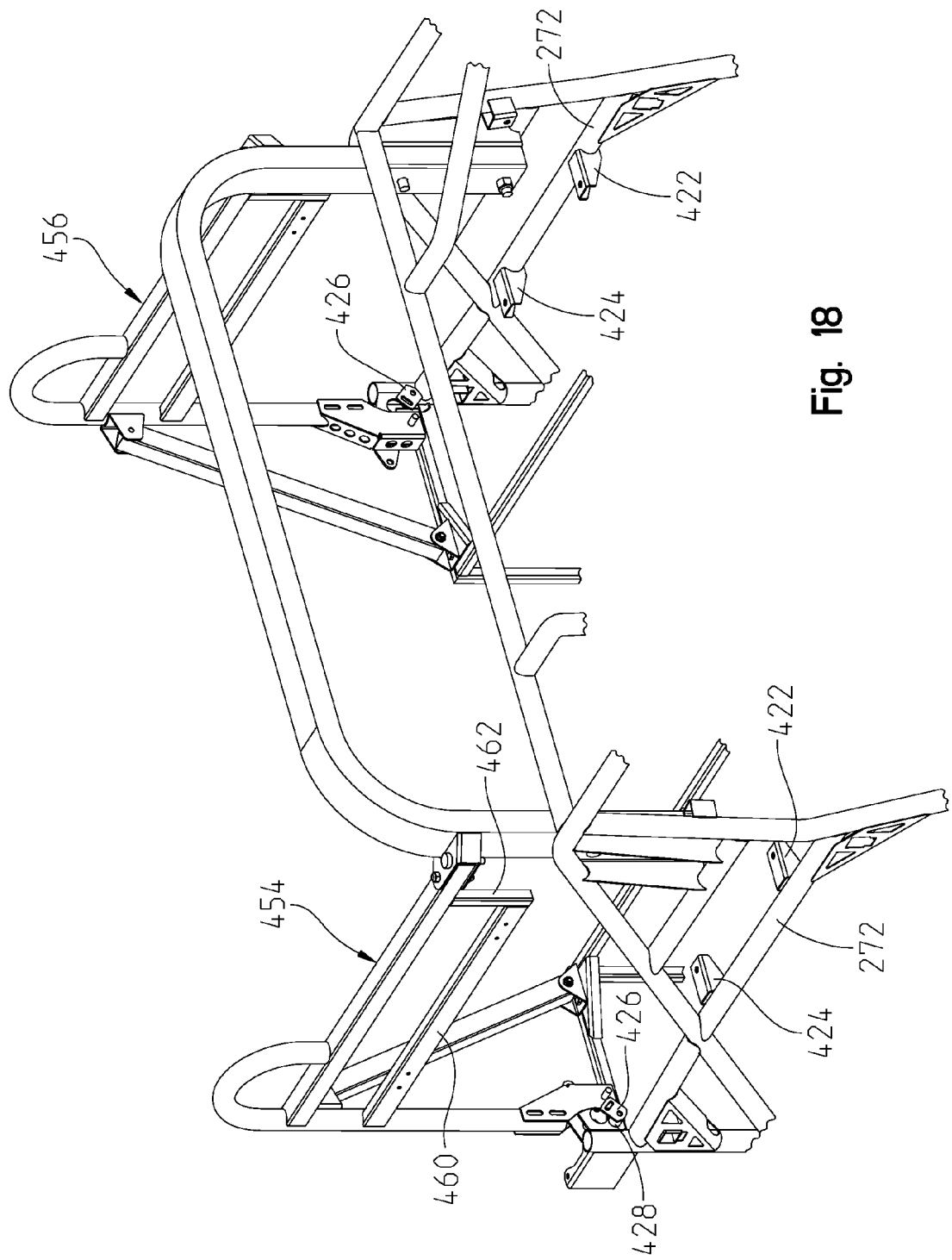
FIG. 18 is a view showing seat belt mounting brackets for the third and rear seating area.
Figure 19:
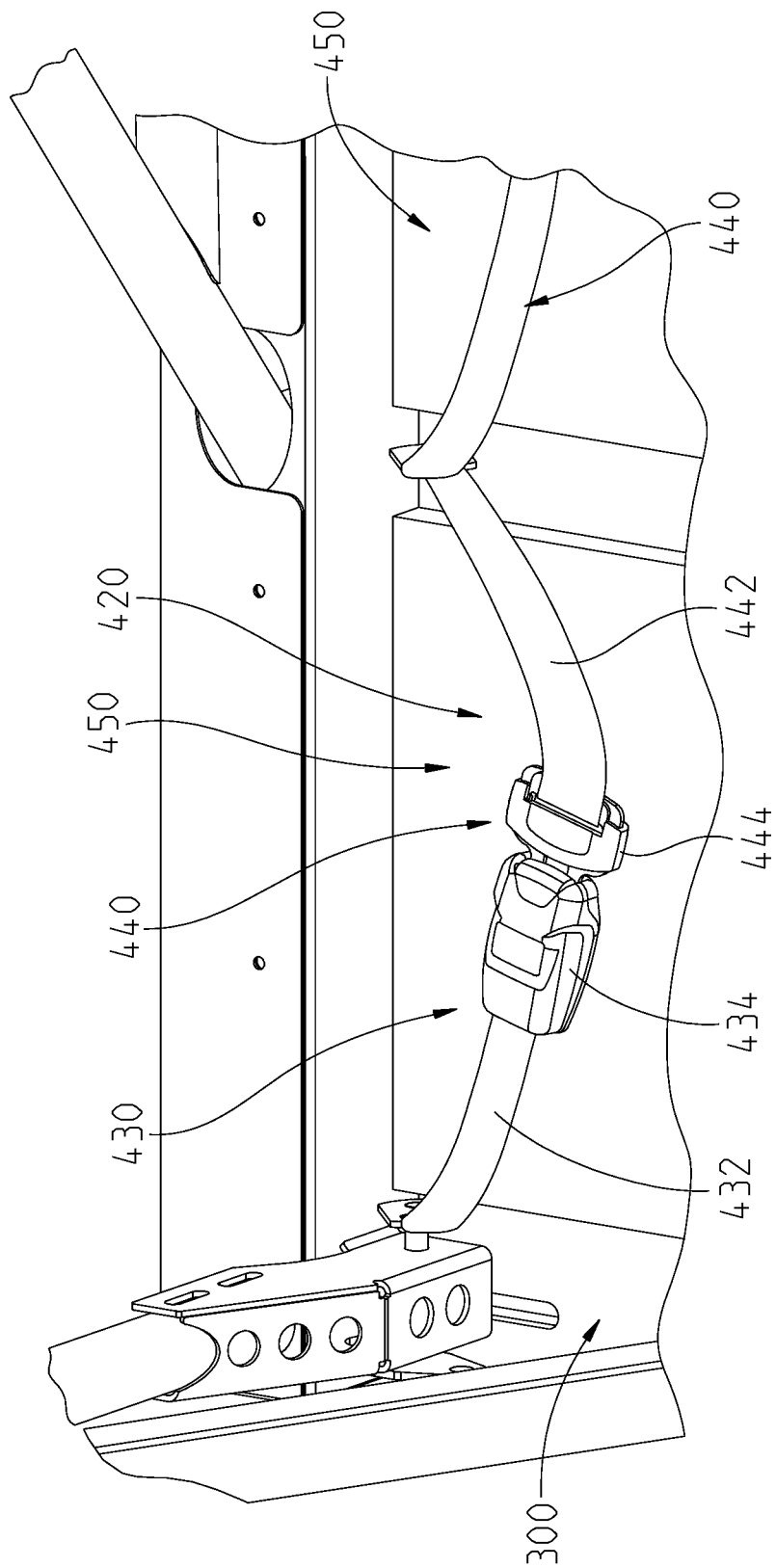
FIG. 19 is a view showing the seat belt assembly.

With reference now to FIGS. 18 and 19, a seat belt assembly 420 for the rear seating area will be described. As shown best in FIG. 18, seat belt assembly includes two brackets 422, 424 welded or otherwise coupled to, outer longitudinal members 272. Brackets 422, 424 are positioned below seat platform 300. A third bracket 426 is coupled to bracket 370 (FIG. 15) by way of coupler 428. A seat belt buckle assembly 430 is coupled to bracket 426 and includes a strap 432 and buckle 434. A second buckle assembly (not visible in FIG. 19) is coupled to bracket 422. Two clip assemblies are coupled to bracket 424 and comprise straps 442 and clips 444. One clip assembly 440 is associated with each buckle assembly 430. Seat cushions 450 may be placed over each seating area 300a and 300b.

In addition, FIG. 18 shows an alternate version of longitudinally extending supports, shown as 454, 456 where frame supports 460 and 462 have been added to rigidify the longitudinally extending supports 454, 456.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. A utility vehicle, comprising:
a plurality of ground-engaging members configured to contact a ground surface;
a drivetrain assembly operably coupled to the ground-engaging members;
a frame supported by the ground-engaging members and extending along a longitudinal axis of the utility vehicle;
a rear support area supported by the frame, the rear support area having a rear platform having at least a first seating position; and a rear cab frame having an upright position and a folded position, and the rear cab frame being positioned over the rear support area when in both the upright and folded positions, wherein when in the folded position, the rear cab grame rests on the rear platform.

2. The utility vehicle of claim 1, wherein when in the upright position, the rear cab frame is positioned generally over the rear platform.

3. The utility vehicle of claim 1, wherein the vehicle includes a first seating area for the driver, a second seating area rearward of the first seating area, where the rear platform is positioned rearward of the second seating area.

4. The utility vehicle of claim 3, wherein the rear platform includes a first rear platform positioned on a first side of the vehicle and a second rear platform position on a second side of the vehicle.

5. The utility vehicle of claim 4, wherein the ground engaging members are tires, and a left platform is generally positioned over a left tire, and a right platform is positioned over a right tire.

6. The utility vehicle of claim 5, wherein each of the first and second rear platforms have two seating positions.

7. The utility vehicle of claim 3, further comprising a cab frame assembly positioned over the first and second seating areas.

8. The utility vehicle of claim 1, wherein the rear cab frame includes a laterally extending support extending generally width-wise of the vehicle, and longitudinally extending supports extending generally length-wise of the vehicle.

9. The utility vehicle of claim 8, wherein the longitudinally extending supports fold inwardly against the laterally extending support, and the combination of the laterally extending support and longitudinally extending supports fold rearwardly and downwardly.

10. The utility vehicle of claim 9, wherein the longitudinally extending supports generally comprise a longitudinally extending portion coupled to the laterally extending support, and a vertically extending portion coupled to the frame.

11. The utility vehicle of claim 10, further comprising an upright coupled to each of the rear platforms and the vertically extending portions.

12. The utility vehicle of claim 11, wherein the uprights each angle outwardly towards the vertically extending portions.

13. A utility vehicle, comprising:
a plurality of ground-engaging members;
a frame assembly supported by the ground-engaging members and extending along a longitudinal axis of the utility vehicle;
seating sections supported by the frame assembly and including a first plurality of seats in a laterally side-by-side configuration, a second plurality of seats in a laterally side-by-side configuration, positioned rearward of the first plurality, and a third plurality of seats in a longitudinally side-by-side configuration, positioned rearward of the second plurality; and
a first cab frame positioned over the first and second seating positions, and a rear cab frame positioned over the third plurality of seats, the rear cab frame extending higher than the first cab frame.

14. The utility vehicle of claim 13, wherein the rear cab frame has an upright position and a folded position.

15. The utility vehicle of claim 14, wherein when in the upright position, the rear cab frame is positioned generally over the third plurality of seats.

16. The utility vehicle of claim 15, wherein the third plurality of seats is defined by a rear platform.

17. The utility vehicle of claim 16, wherein the rear platform includes a first rear platform positioned on a first side of the vehicle and defining the third plurality of seats, and a second rear platform on a second side of the vehicle opposite the first side and defining a fourth plurality of seats in a longitudinally side-by-side configuration opposed from the third plurality of seats.

18. The utility vehicle of claim 17, wherein when in the folded position, the rear cab frame rests on the rear platform.

19. The utility vehicle of claim 17, wherein the ground engaging members are tires, and the first rear platform is generally positioned over a left tire, and the second rear platform is positioned over a right tire.

20. The utility vehicle of claim 19, wherein each of the first and second rear platforms have two seating positions.

21. The utility vehicle of claim 13, wherein the rear cab frame includes a laterally extending support extending generally width-wise of the vehicle, and longitudinally extending supports extending generally length-wise of the vehicle.

22. The utility vehicle of claim 21, wherein the longitudinally extending supports fold inwardly against the laterally extending support, and the combination of the laterally extending support and longitudinally extending supports fold rearwardly and downwardly.

23. The utility vehicle of claim 22, wherein the longitudinally extending supports generally comprise a longitudinally extending portion coupled to the laterally extending support, and a vertically extending portion coupled to the frame.

24. The utility vehicle of claim 23, wherein the rear platform includes at least a first rear platform and a second rear platform, and an upright is coupled to each of the first and second rear platforms and the vertically extending portions.

25. The utility vehicle of claim 24, wherein the uprights each angle outwardly towards the vertically extending portions.

26. A utility vehicle, comprising:
a plurality of ground-engaging members configured to contact a ground surface;
a drivetrain assembly operably coupled to the ground-engaging members;
a frame supported by the ground-engaging members and extending along a longitudinal axis of the utility vehicle;
a rear support area supported by the frame, the rear support area having a rear platform having at least a first seating position; and
a rear cab frame having an upright position and a folded position, the rear cab frame is positioned generally over the rear platform when in the upright position and the rear cab frame rests on the rear platform when in the folded position.

27. A utility vehicle, comprising:
a plurality of ground-engaging members configured to contact a ground surface;
a drivetrain assembly operably coupled to the ground-engaging members;
a frame supported by the ground-engaging members and extending along a longitudinal axis of the utility vehicle;
a rear support area supported by the frame, the rear support area having a rear platform having at least a first seating position; and
a rear cab frame having an upright position and a folded position, and the rear cab frame including a laterally extending support extending generally width-wise of the vehicle and longitudinally extending supports extending generally length-wise of the vehicle, wherein the longitudinally extending supports fold inwardly against the laterally extending support, and the combination of the laterally extending support and longitudinally extending supports fold rearwardly and downwardly.

28. A utility vehicle, comprising:

a plurality of ground-engaging members;

a frame assembly supported by the ground-engaging members and extending along a longitudinal axis of the utility vehicle;

seating sections supported by the frame assembly and including a first plurality of seats in a laterally side-by-side configuration, a second plurality of seats in a laterally side-by-side configuration, positioned rearward of the first plurality, and a third plurality of seats in a longitudinally side-by-side configuration, positioned rearward of the second plurality; and a first cab frame positioned over the first and second seating positions, and a rear cab frame positioned over the third plurality of seats, the rear cab frame including a laterally extending support extending generally width-wise of the vehicle and longitudinally extending supports extending generally length-wise of the vehicle, the longitudinally extending supports being configured to fold inwardly against the laterally extending support, and the combination of the laterally extending support and the longitudinally extending supports being configured to fold rearwardly and downwardly.

* * * * *